(12) United States Patent
Mok et al.

(10) Patent No.: US 10,979,637 B2
(45) Date of Patent: Apr. 13, 2021

(54) METHOD AND APPARATUS FOR DETERMINING OPERATION MODE OF CAMERA

(71) Applicant: Hanwha Techwin Co., Ltd., Seongnam-si (KR)

(72) Inventors: Seung Jun Mok, Seongnam-si (KR); Min Suk Sung, Seongnam-si (KR); Durga Prasad Jujjuru, Seongnam-si (KR)

(73) Assignee: Hanwha Techwin Co., LTD., Seongnam-si (KR)

( * ) Notice: Subject to any disclaimer, the term of this patent is extended or adjusted under 35 U.S.C. 154(b) by 41 days.

(21) Appl. No.: 16/057,817

(22) Filed: Aug. 8, 2018

(65) Prior Publication Data
US 2019/0068882 A1    Feb. 28, 2019

(30) Foreign Application Priority Data
Aug. 23, 2017    (KR) .................. 10-2017-0106645

(51) Int. Cl.
*H04N 5/232*    (2006.01)
*G06K 9/00*    (2006.01)
*G06K 9/20*    (2006.01)

(52) U.S. Cl.
CPC ..... *H04N 5/23245* (2013.01); *G06K 9/00624* (2013.01); *G06K 9/2027* (2013.01); *H04N 5/23206* (2013.01); *H04N 5/23296* (2013.01); *H04N 5/23299* (2018.08); *H04N 5/232935* (2018.08)

(58) Field of Classification Search
CPC .......... H04N 5/23245; H04N 5/23299; H04N 5/23296; H04N 5/23206; H04N 5/232935; H04N 7/181; H04N 5/23216; G06K 9/2027; G06K 9/00624
See application file for complete search history.

(56) References Cited

U.S. PATENT DOCUMENTS

| 9,413,942 B2 | 8/2016 | Cho et al. | |
|---|---|---|---|
| 9,936,117 B2 | 4/2018 | Cho et al. | |
| 2003/0098789 A1* | 5/2003 | Murakami | G08B 13/1968 340/506 |

(Continued)

FOREIGN PATENT DOCUMENTS

| KR | 10-2015-0086720 | 7/2015 |
|---|---|---|
| KR | 10-1698500 | 2/2016 |
| KR | 10-1726315 | 4/2017 |

*Primary Examiner* — Lin Ye
*Assistant Examiner* — Tuan H Le
(74) *Attorney, Agent, or Firm* — H.C. Park & Associates, PLC

(57) ABSTRACT

A method of determining an operation mode of a camera with respect to each of a plurality of time periods includes: obtaining installation environment information of the camera, the information including images obtained by the camera in the plurality of time periods; determining one or more candidate operation modes with respect to each of the plurality of time periods, with reference to the installation environment information of the camera; and determining, as the operation mode of the camera with respect to each of the plurality of time periods, any one of the determined one or more candidate operation modes with respect to the each of the plurality of time periods.

17 Claims, 5 Drawing Sheets

(56) References Cited

U.S. PATENT DOCUMENTS

| | | | |
|---|---|---|---|
| 2008/0088710 A1* | 4/2008 | Iwamoto | H04N 1/32128 |
| | | | 348/220.1 |
| 2009/0073285 A1* | 3/2009 | Terashima | H04N 5/23218 |
| | | | 348/231.99 |
| 2009/0317056 A1 | 12/2009 | Hu et al. | |
| 2014/0198215 A1* | 7/2014 | Schumm | H04N 7/181 |
| | | | 348/159 |
| 2019/0020827 A1* | 1/2019 | Siminoff | H04N 5/232411 |
| 2019/0098199 A1* | 3/2019 | Hlatky | H04N 5/23245 |

* cited by examiner

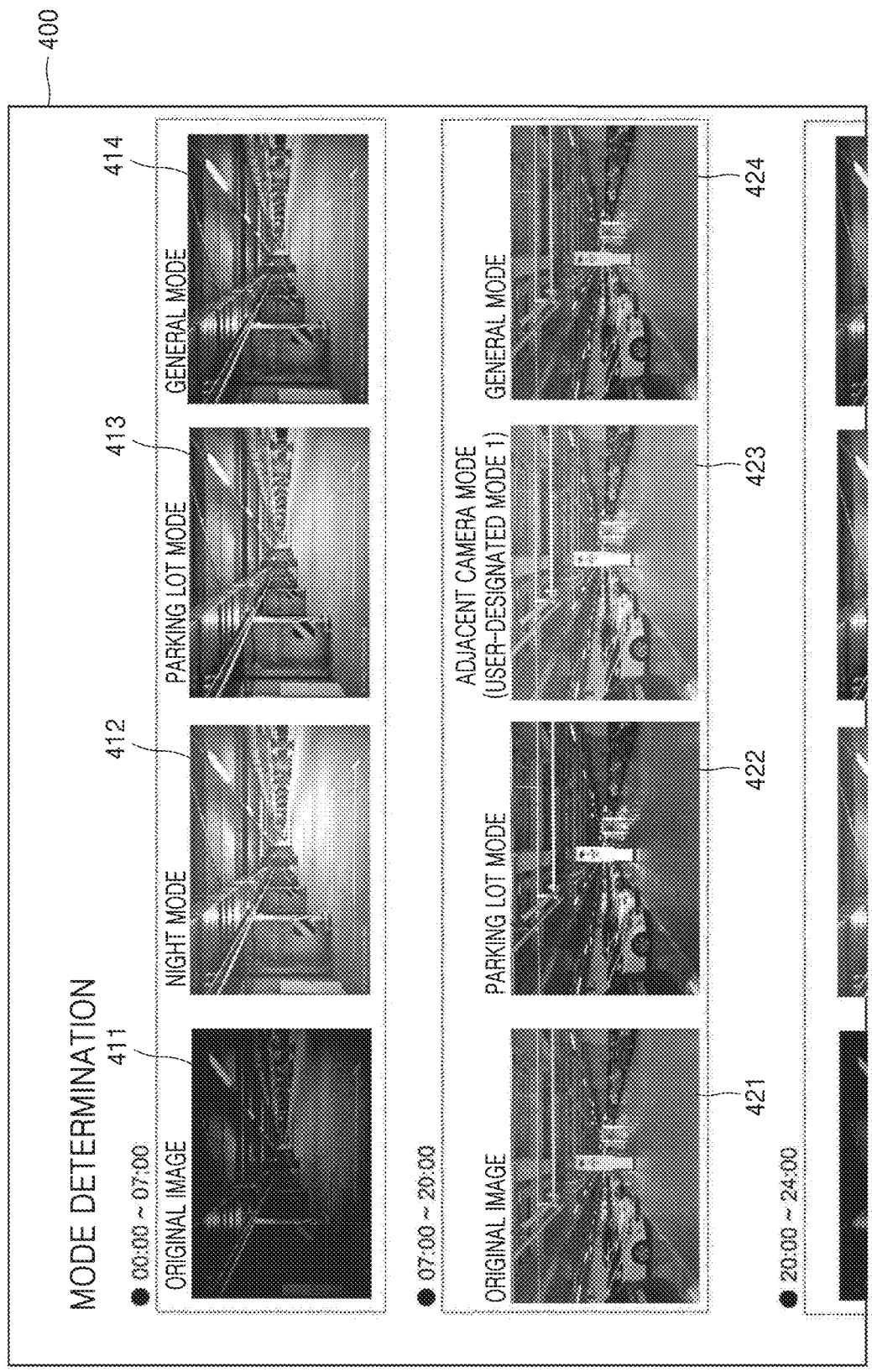

FIG. 5B
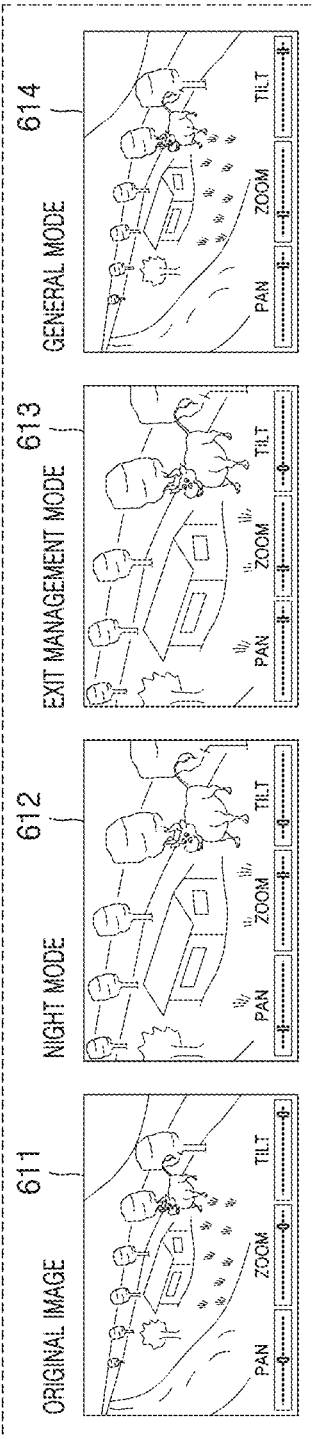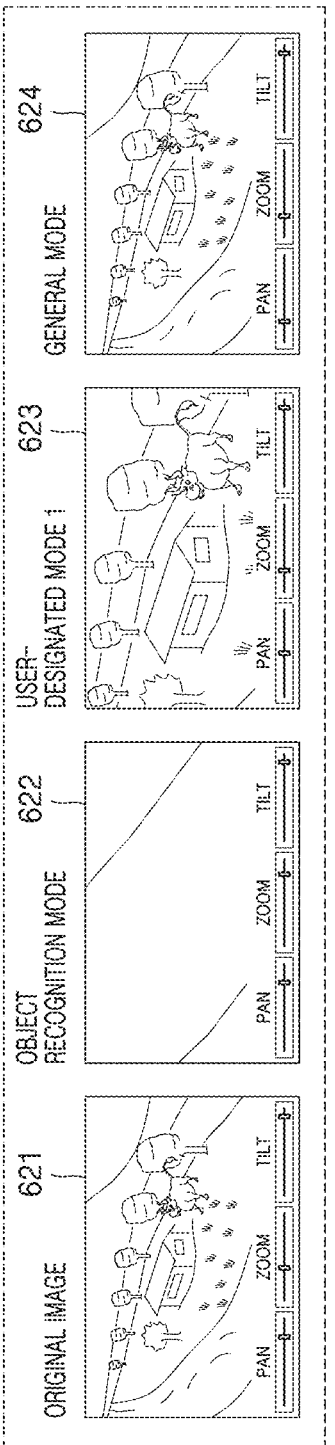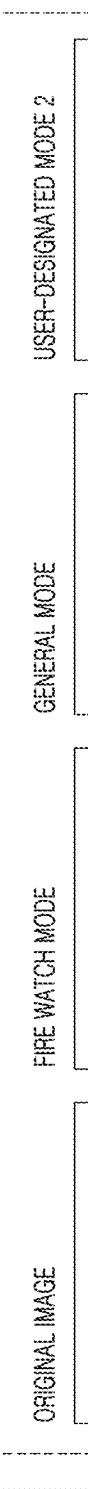

METHOD AND APPARATUS FOR DETERMINING OPERATION MODE OF CAMERA

CROSS-REFERENCE TO RELATED APPLICATION

This application claims priority from and the benefit of Korean Patent Application No. 10-2017-0106645, filed on Aug. 23, 2017, which is hereby incorporated by reference for all purposes as if fully set forth herein.

BACKGROUND

Field

Exemplary embodiments/implementations of the invention relate generally to a method and an apparatus for determining an operation mode of a camera.

Discussion of the Background

Presently, numerous cameras are installed everywhere and techniques for recording, storing, and transmitting images obtained by the cameras have been developed.

In particular, as the number of cameras installed has increased, a multi-channel surveillance system configured to sense a sensing object area by receiving images from the plurality of cameras has been actively developed.

However, it is inconvenient that operation modes of the cameras included in the multi-channel surveillance system have to be set separately, even when the cameras have substantially the same or similar installation environments. Also, when a camera that is installed where an environment changes according to time is set in one operation mode, the camera may not be able to properly obtain an image in a specific time period.

The above information disclosed in this Background section is only for understanding of the background of the inventive concepts, and, therefore, it may contain information that does not constitute prior art.

SUMMARY

One or more exemplary embodiments include a method and an apparatus for determining an operation mode of a camera based on a time period.

One or more exemplary embodiments include a method and an apparatus for conveniently setting an operation mode of a camera with respect to each of a plurality of time periods, so that the camera is capable of obtaining an optimum image in all of the time periods.

One or more exemplary embodiments include a method and an apparatus for setting an operation mode of a camera, whereby a preview image when a candidate operation mode is applied to the camera is provided together with an image in a corresponding time period, so that the operation mode is intuitively selected with respect to each of a plurality of time periods and a time for setting the camera is reduced.

One or more exemplary embodiments include a method and an apparatus for setting operation modes of cameras of various forms including a pan tilt zoom (PTZ) camera and a multi-sensor camera, with respect to each of a plurality of time periods, so that the cameras are capable of obtaining an optimum image.

Additional features of the inventive concepts will be set forth in the description which follows, and in part will be apparent from the description, or may be learned by practice of the inventive concepts.

According to one or more exemplary embodiments, a method of determining an operation mode of a camera with respect to each of a plurality of time periods includes: obtaining installation environment information of the camera, the installation environment information including images obtained by the camera in the plurality of time periods; determining one or more candidate operation modes with respect to each of the plurality of time periods, with reference to the installation environment information of the camera; and determining the operation mode of the camera with respect to each of the plurality of time periods, wherein the operation mode is selected from of the determined one or more candidate operation modes with respect to the each of the plurality of time periods.

The determining of the one or more candidate operation modes may include determining the one or more candidate operation modes based on the installation environment information and an operation mode determinant. The operation mode determinant may include a pre-learned data set indicating a correlation between a plurality of installation environment information and a plurality of operation modes.

The installation environment information may include installation location information of the camera, and the determining of the one or more candidate operation modes may includes: identifying operation modes of a certain number of adjacent cameras adjacent to the camera, with reference to the installation location information; and determining the one or more candidate operation modes based on the operation modes of the certain number of adjacent cameras.

The determining of the operation mode of the camera with respect to each of the plurality of time periods may include: providing a user with one or more candidate operation modes with respect to a first time period and an image obtained in the first time period; and determining an operation mode of the first time period based on a user selection with respect to the one or more candidate operation modes with respect to the first time period.

The providing the user with the one or more candidate operation modes with respect to the first time period and the image obtained in the first time period may include: generating a preview image corresponding to each of the one or more candidate operation modes by correcting the image obtained in the first time period to correspond to each of the one or more candidate operation modes; and providing the user with the preview image corresponding to each of the one or more candidate operation modes, together with the image obtained in the first time period.

The method may further include, after determining the operation mode of the camera with respect to each of the plurality of time periods, changing an image setting value and an image analysis method of the camera to correspond to the determined operation mode, with respect to each of the plurality of time periods.

The one or more candidate operation modes with respect to each of the plurality of time periods may include an image setting value of the camera for obtaining the image and an image analysis method with respect to the obtained image.

The camera may be a pan tilt zoom (PTZ) camera, and the one or more candidate operation modes with respect to each of the plurality of time periods may further include at least one of a pan value, a tilt value, and a zoom value, in addition to the image setting value and the image analysis method of the camera.

The camera may be a multi-sensor camera including two or more image sensors configured to obtain images, and the one or more candidate operation modes with respect to the each of the plurality of time periods may include an image setting value and an image analysis method of each of the two or more image sensors, with respect to each of the plurality of time periods.

A non-transitory computer-readable recording medium storing a computer program for determining an operation mode of a camera with respect to each of a plurality of time periods, wherein the computer program, when executed by a computer, performs the method including: obtaining installation environment information of the camera, the installation environment information comprising images obtained by the camera in the plurality of time periods; determining one or more candidate operation modes with respect to each of the plurality of time periods, with reference to the installation environment information of the camera; and determining the operation mode of the camera with respect to each of the plurality of time periods, wherein the operation mode is selected from the determined one or more candidate operation modes with respect to the each of the plurality of time periods.

According to one or more exemplary embodiments, an apparatus for determining an operation mode of a camera with respect to each of a plurality of time periods includes a controller configured to: obtain installation environment information of the camera, the installation environment information including images obtained by the camera in the plurality of time periods; determine one or more candidate operation modes with respect to each of the plurality of time periods, with reference to the installation environment information of the camera; and determine the operation mode of the camera with respect to each of the plurality of time periods, wherein the operation mode is selected from the determined one or more candidate operation modes with respect to the each of the plurality of time periods.

The controller may further be configured to determine the one or more candidate operation modes based on the installation environment information and an operation mode determinant. The operation mode determinant may include a pre-learned data set indicating a correlation between a plurality of installation environment information and a plurality of operation modes.

The installation environment information may include installation location information of the camera, and the controller may further be configured to: identify operation modes of a certain number of adjacent cameras adjacent to the camera, with reference to the installation location information; and determine the one or more candidate operation modes based on the operation modes of the certain number of adjacent cameras.

The controller may further be configured to: provide a user with one or more candidate operation modes with respect to a first time period and an image obtained in the first time period; and determine an operation mode of the first time period based on a user selection with respect to the one or more candidate operation modes with respect to the first time period.

The controller may further be configured to: generate a preview image corresponding to each of the one or more candidate operation modes by correcting the image obtained in the first time period to correspond to each of the one or more candidate operation modes; and provide the user with the preview image corresponding to each of the one or more candidate operation modes, together with the image obtained in the first time period.

The controller may further be configured to change an image setting value and an image analysis method of the camera to correspond to the determined operation mode, with respect to each of the plurality of time periods.

The one or more candidate operation modes and the operation mode with respect to each of the plurality of time periods may include an image setting value of the camera for obtaining the image and an image analysis method with respect to the obtained image.

The camera may be a pan tilt zoom (PTZ) camera, and the one or more candidate operation modes with respect to each of the plurality of time periods may further include at least one of a pan value, a tilt value, and a zoom value, in addition to the image setting value and the image analysis method of the camera.

The camera may be a multi-sensor camera including two or more image sensors configured to obtain images, and the one or more candidate operation modes with respect to the each of the plurality of time periods may include an image setting value and an image analysis method of each of the two or more image sensors, with respect to each of the plurality of time periods.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

FIG. 4 illustrates an exemplary embodiment of a mode determination screen displayed on a display.

FIG. 5B illustrates an exemplary embodiment of a mode determination screen displayed on a display, in the case of a PTZ camera.

DETAILED DESCRIPTION

Figure 1:
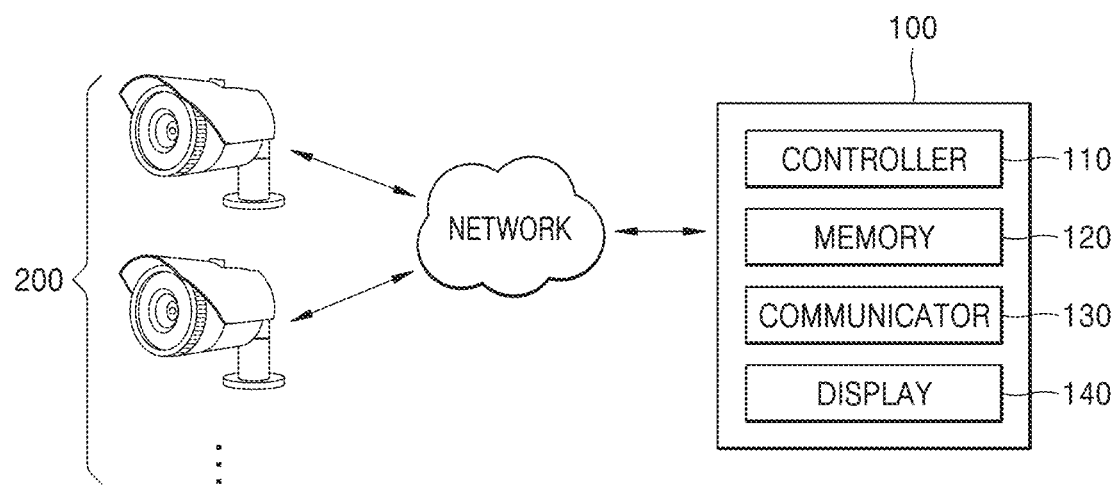
FIG. 1 schematically illustrates a surveillance system according to an exemplary embodiment.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

In the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element is referred to as being "on," "connected to," or "coupled to" another element, it may be directly on, connected to, or coupled to the other element or intervening elements may be present. When, however, an element is referred to as being "directly on," "directly connected to," or "directly coupled to" another element or layer, there are no intervening elements present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z—axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

As customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

FIG. 1 schematically illustrates a surveillance system according to an exemplary embodiment.

Referring to FIG. 1, the surveillance system according to an exemplary embodiment may include an apparatus 100 for determining an operation mode of a camera and one or more cameras 200.

In the surveillance system according to an exemplary embodiment, the apparatus 100 for determining an operation mode of a camera may be configured to obtain installation environment information of the one or more cameras 200 with respect to each of a plurality of time periods and determine an operation mode of the one or more cameras 200 with respect to each of the plurality of time periods.

The one or more cameras 200 according to an exemplary embodiment may be devices including a lens and an image sensor. The lens may denote a group of lenses including one or more lenses. The image sensor may convert an image input through the lens into an electrical signal. For example, the image sensor may be a semiconductor device, such as a charge-coupled device (CCD) or a complementary metal oxide semiconductor (CMOS), which is configured to convert an optical signal into an electrical image (that is, an image). The one or more cameras 200 may encode the obtained image in various methods and transmit the encoded image.

The one or more cameras 200 according to an exemplary embodiment may include a plurality of cameras. In other words, the one or more cameras 200 may include two cameras as illustrated in FIG. 1, may include one camera, or may include a plurality of cameras. The number of the one or more cameras 200 may be determined based on an environment and/or a condition in which the surveillance system according to an exemplary embodiment is installed.

The one or more cameras 200 may include a pan tilt zoom (PTZ) camera configured to change a photographing viewing angle, a photographing scale, and a photographing magnification. Also, the one or more cameras 200 may include a multi-sensor camera including two or more image sensors configured to obtain images. However, these two types of the one or more cameras 200 described above are only examples, and the present disclosure is not limited thereto.

The apparatus 100 for determining an operation mode of a camera according to an exemplary embodiment may obtain installation environment information of the one or more cameras 200 with respect to each of a plurality of time periods and may determine operation modes of the one or more cameras 200 with respect to each of the plurality of time periods. To this end, the apparatus 100 for determining an operation mode of a camera according to an exemplary embodiment may include a controller 110, a memory 120, a communicator 130, and a display 140.

The controller 110 according to an exemplary embodiment may include all types of devices configured to process data, such as a processor. Here, the "processor" may denote, for example, a data processing device embedded in hardware and having physically structured circuits for executing functions indicated by code or commands included in a program. Examples of the data processing device embedded in hardware may include a microprocessor, a central processing unit (CPU), a processor core, a multiprocessor, an application-specific integrated circuit (ASIC), a field programmable gate array (FPGA), etc., but the present disclosure is not limited thereto.

The memory 120 according to an exemplary embodiment may temporarily or permanently store data processed by the apparatus 100 for determining an operation mode of a camera. The memory 120 may include magnetic storage media or flash storage media, but the present disclosure is not limited thereto.

The communicator 130 according to an exemplary embodiment may be a device including hardware and software, which is needed for the apparatus 100 for determining an operation mode of a camera to transmit and receive signals, such as an image signal or a control signal, to and from the one or more cameras 200 and/or other network apparatuses (not shown) via a communication network.

Here, the communication network may include wired networks, such as local area networks (LANs), wide area networks (WANs), metropolitan area networks (MANs), integrated service digital networks (ISDNs), etc., and wireless networks, such as wireless LANs, code division multiple access (CDMA), Bluetooth, satellite communication, etc., but the present disclosure is not limited thereto.

The display 140 according to an exemplary embodiment may denote a display configured to display a figure, text or a combination thereof, based on an electrical signal generated by the apparatus 100 for determining an operation mode of a camera. For example, the display 140 may include any one of a cathode ray tube (CRT), a liquid crystal display (LCD), a plasma display panel (PDP), and an organic light-emitting diode (OLED) display, but the present disclosure is not limited thereto.

The apparatus 100 for determining an operation mode of a camera according to an exemplary embodiment may be provided separately from the one or more cameras 200, as illustrated in FIG. 1, or may be included in the one or more cameras 200.

Also, the apparatus 100 for determining an operation mode of a camera may be included in another external apparatus (for example, a network video recorder (NVR), etc.). However, it is only an example, and the present disclosure is not limited thereto. Hereinafter, for convenience of explanation, it is described assuming that the apparatus 100 for determining an operation mode of a camera is separately provided from the one or more cameras 200 and/or an external apparatus, and the one or more cameras 200 include one camera.

The controller 110 of the apparatus 100 for determining an operation mode of a camera according to an exemplary embodiment may obtain installation environment information of the camera 200, the information including images obtained by the camera 200 in a plurality of time periods, in order to determine an operation mode of the camera 200 with respect to each of the plurality of time periods.

Here, the "installation environment information" may include the images obtained by the camera 200 in the plurality of time periods and various information about an installation environment of the camera 200. For example, the installation environment information may include information about a location in which the camera 200 is installed. Also, the installation environment information may include information about a brightness, a temperature, a humidity, whether or not there is fog around the camera 200, etc. However, it is only an example, and the present disclosure is not limited thereto. Any information about an environment in which the camera 200 is installed or information about a state of the camera 200 may be included in the "installation environment information" according to the present disclosure.

The operation mode of the camera 200 according to the present disclosure may denote a setting state of the camera 200 including an "image setting value" for obtaining an image and an "image analysis method" with respect to an obtained image.

Here, the "image setting value" for obtaining an image may include a resolution of an image, a frame rate of an image, an exposure sensitivity of an image, an aperture value, a white balance, or the like.

The "image analysis method" may include a method of recognizing and tracking a person in an obtained image, a method of recognizing a license plate number in an obtained image, a method of recognizing loitering of an object in an obtained image, a method of recognizing an object intruding into a certain set area in an obtained image, or the like. However, the image setting value and the image analysis method described above are examples, and the present disclosure is not limited thereto.

For example, a parking lot mode of the camera may include an image setting value including a high exposure sensitivity (ISO) and a high sharpness and an image analysis method for recognizing a license plate number in an obtained image.

Also, a person sensing mode may include an image setting value including a low exposure sensitivity and an image analysis method for recognizing a face in an obtained image.

However, these are only examples, and the present disclosure is not limited thereto.

Next, the controller 110 according to an exemplary embodiment may determine one or more candidate operation modes with respect to each of the plurality of time periods, based on the installation environment information of the camera 200, which is obtained by the process described above. Here, the controller 110 may determine the one or more candidate operation modes with respect to each of the plurality of time periods, by using various methods.

For example, the controller 110 may determine the one or more candidate operation modes based on the installation environment information obtained by the process described above and an operation mode determinant. Here, the operation mode determinant may be a pre-learned data set indicating a correlation between a plurality of pieces of installation environment information and a plurality of operation modes.

That is, the operation mode determinant may be information about the correlation between the plurality of pieces of installation environment information and the plurality of operation modes, that is, mapping information thereof, which is generated via a machine learning method. For example, the operation mode determinant may be trained via a plurality of pieces of test data indicating an image and a desirable operation mode of the camera 200 in an environment corresponding to the image. Here, the image may be included in the installation environment information.

Meanwhile, when the installation environment information includes the information of the location in which the camera 200 is installed, the controller 110 may determine the one or more candidate operation modes based on an operation mode of another camera adjacent to the camera 200. In more detail, the controller 110 may identify operation modes of a certain number of cameras adjacent to the camera 200, based on the installation location information of the camera 200, the operation mode of which is to be determined. Here, a criterion of being adjacent may vary. For example, the controller 110 may determine being adjacent means to be located in the same space (for example, the same room or the same floor). Also, when the installation location information includes the form of specific coordinates, the controller 110 may determine being adjacent means when a distance between two locations is equal to or less than a certain critical distance. However, these are only examples, and the present disclosure is not limited thereto.

The controller 110 may identify the operation modes of the adjacent cameras and may determine the operation mode of the most adjacent camera as the one or more candidate operation modes. Also, the controller 110 may determine the operation mode, which is the most frequent from among the operation modes of the adjacent cameras, as the one or more candidate operation modes. However, the controller 110 may determine both of these two operation modes described above as the one or more candidate operation modes. However, these are only examples, and the present disclosure is not limited thereto.

When the camera 200 is a multi-sensor camera including a plurality of image sensors, the operation mode of each of the plurality of image sensors may be separately set as described below. Thus, in the case of the multi-sensor camera, adjacent cameras may denote adjacent sensors.

As described above, the controller 110 according to an exemplary embodiment may determine the one or more candidate operation modes with respect to each of the plurality of time periods. In other words, the controller 110 may differently set the operation modes of the camera 200 with respect to the plurality of time periods.

According to the related art, even though a condition (for example, the amount of light, the volume of traffic, etc.) of a surrounding environment in which the camera 200 is installed changes with time, the camera 200 is set in one operation mode, thereby not being able to obtain a proper image in a specific time period. This may raise a serious problem, such as an impossibility of reading an image, which may consequently cause the surveillance system to be useless.

According to the present disclosure, the operation mode of the camera 200 may be simply set with respect to each of the plurality of time periods, so that the camera 200 may obtain optimum images in all of the plurality of time periods.

In the present disclosure, the "time period" may denote a temporal section defined by a start point and an end point. The time period may be set to have a certain period (for example, ten minutes, one hour, etc.). In this case, the controller 110 may obtain the installation environment information of the camera 200 based on a certain time interval and may determine the candidate operation modes of the camera 200 based on the obtained installation environment information and the operation mode based on the candidate operation modes.

Also, the time period may be set as various periods based on a change in the installation environment information. In this case, when the controller 110 determines that a change equal to or higher than a certain value occurs between installation environment information in a previous time period and the installation environment information, the controller 110 may start a new time period (that is, a temporal section), and may determine new candidate operation modes and a new operation mode with respect to the new time period. However, this is only an example, and the present disclosure is not limited thereto.

The controller 110 according to an exemplary embodiment may determine any one of the one or more candidate operation modes with respect to each of the plurality of time periods, as the operation mode of the camera 200 in each of the plurality of time periods.

Here, the controller 110 may select any one of the one or more candidate operation modes as the operation mode based on a user input. In more detail, the controller 110 may provide, to a user, the one or more candidate operation modes with respect to a certain time period and an image obtained in the time period, via the display 140.

Here, the controller 110 may further provide preview images corresponding to the one or more candidate operation modes. In more detail, the controller 110 may generate the preview images corresponding to the one or more candidate operation modes by correcting an image obtained in each of the plurality of time periods to correspond to the one or more candidate operation modes. In other words, the controller 110 may generate the preview images predicted when the one or more candidate operation modes are to be applied to the camera 200. Next, the controller 110 may provide, to the user, the preview images corresponding to the one or more candidate operation modes with respect to each of the plurality of time periods, together with the image obtained in each of the plurality of time periods.

For example, when there are three candidate operation modes, the controller 110 may generate three preview images predicted when the three candidate operation modes are applied to the camera 200, respectively, and display the three preview images on the display 140, in addition to the image obtained in the corresponding time period. Here, the controller 110 may determine the operation mode in the corresponding time period, based on a user input of selecting the one or more candidate operation modes.

As described above, the operation of determining the operation mode in a corresponding time period based on the user input may be performed in the same way with respect to the plurality of time periods. For example, when there are three time periods, the user may select the operation mode with respect to each of the three time periods, thereby separately selecting the operation modes with respect to the three time periods.

Meanwhile, when the controller 110 provides the one or more candidate operation modes to the user, the controller 110 may provide the one or more candidate operation modes based on a priority order.

For example, when the controller 110 determines the one or more candidate operation modes based on the operation mode determinant, as described above, the controller 110 may display, at first, the candidate operation mode having the highest relevance.

Also, when the controller 110 determines the most frequent operation mode from among the operation modes of the adjacent cameras, as the one or more candidate operation modes, the controller 110 may display, at first, the top three frequent operation modes as the one or more candidate operation modes.

The controller 110 according to an exemplary embodiment may change the image setting value and the image analysis method of the camera 200 to correspond to the determined operation mode in each of the plurality of time periods. As described above, the image setting value may include a resolution of an image, a frame rate of an image, an exposure sensitivity of an image, an aperture value, a white balance, or the like. Also, the image analysis method may include a method of recognizing and tracking a person in an obtained image, a method of recognizing a license plate number in an obtained image, a method of recognizing loitering of an object in an obtained image, a method of recognizing an object intruding into a certain set area in an obtained image, or the like. However, the image setting value and the image analysis method described above are examples, and the present disclosure is not limited thereto.

The apparatus 100 for determining an operation mode of a camera according to an exemplary embodiment may operate in synchronization to cameras of various forms.

For example, it is assumed that the apparatus 100 for determining an operation mode of a camera operates in synchronization with a PTZ camera. In this case, the controller 110 may determine the one or more candidate operation modes such that the one or more candidate operation modes include at least one of a pan value, a tilt value, and a zoom value, with respect to each of the plurality of time periods. Here, the controller 110 may determine the pan value, the tilt value, and the zoom value based on the installation environment information obtained from the camera 200. For example, the controller 110 may identify a portion of an image included in the installation environment information, in which a change occurs in a certain temporal section, and may determine at least one of the pan value, the tilt value, and the zoom value so that only the portion in which the change occurs is included in the image. Accordingly, the operation mode of the camera 200 may further include at least one of the pan value, the tilt value, and the zoom value, in addition to the image setting value and the image analysis method of the obtained image described above.

Accordingly, according to the present disclosure, the camera 200 may obtain the image according to a photographing viewing angle, a photographing scale, and a photographing magnification, which are the most appropriate, with respect to each of the plurality of time periods.

Next, it is assumed that the apparatus 100 for determining an operation mode of a camera operates in synchronization with a multi-sensor camera. In this case, the controller 110 may determine an image setting value and an image analysis method of each of two or more image sensors included in the camera 200, with respect to each of the plurality of time periods. In other words, when the camera 200 is a multi-sensor camera, the controller 110 may determine the operation mode of the camera 200 such that the operation mode includes the image setting value and the image analysis method of each of the two or more image sensors, with respect to each of the plurality of time periods.

By doing so, each image sensor of the camera 200 may obtain an optimum image.

Figure 2:
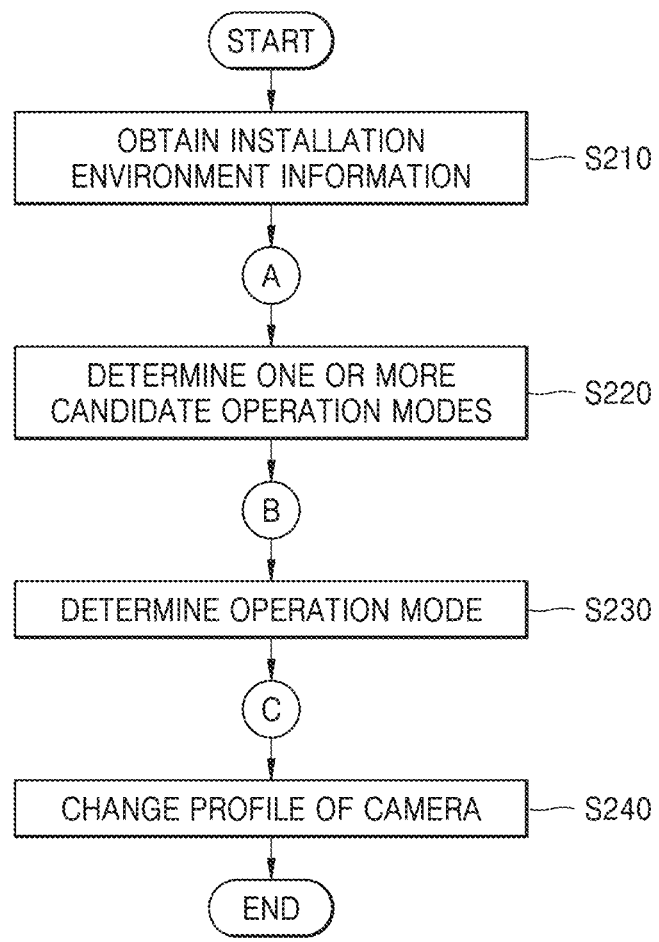
FIGS. 2, 3A, and 3B are flowcharts of a method of determining an operation mode of a camera according to an exemplary embodiment, the method being performed by an apparatus for determining an operation mode of a camera.
Figure 3A:
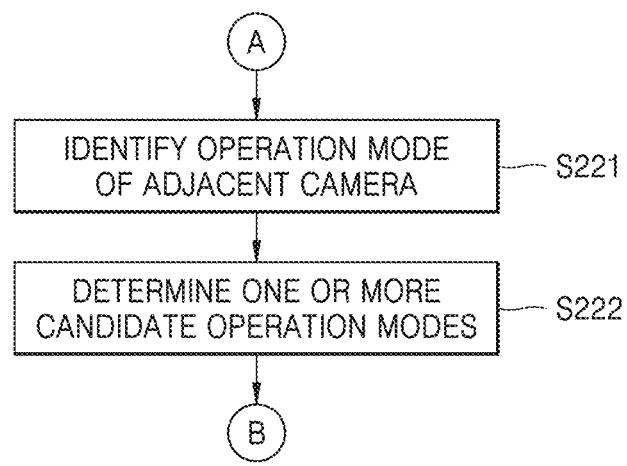
Figure 3B:
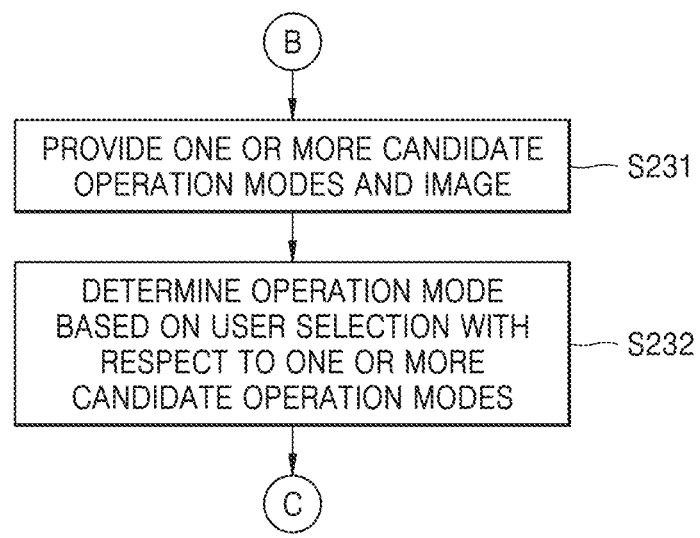

FIGS. 2, 3A, and 3B are flowcharts of a method of determining an operation mode of a camera, the method being performed by the apparatus 100 for determining an operation mode of a camera. Hereinafter, the aspects described in FIG. 1 will not be repeatedly described in detail, and descriptions will be given with reference to FIGS. 2, 3A, and 3B, altogether.

The apparatus 100 for determining an operation mode of a camera according to an exemplary embodiment may obtain installation environment information of the camera 200, the information including images obtained by the camera 200 in a plurality of time periods, in order to determine the operation mode of the camera 200 in each of the plurality of time periods (S210).

Here, the "installation environment information" may include the images obtained by the camera 200 in the plurality of time periods and various information about an installation environment of the camera 200. For example, the installation environment information may include information about a location in which the camera 200 is installed. Also, the installation environment information may include information about a brightness, a temperature, a humidity, whether or not there is fog around the camera 200, etc.

However, it is only an example, and the present disclosure is not limited thereto. Any information about an environment in which the camera 200 is installed or information about a state of the camera 200 may be included in the "installation environment information" according to the present disclosure.

The operation mode of the camera 200 according to the present disclosure may denote a setting state of the camera 200 including an image setting value for obtaining an image and an image analysis method with respect to an obtained image.

Here, the image setting value for obtaining an image may include a resolution of an image, a frame rate of an image, an exposure sensitivity of an image, an aperture value, a white balance, or the like.

The image analysis method may include a method of recognizing and tracking a person in an obtained image, a method of recognizing a license plate number in an obtained image, a method of recognizing loitering of an object in an obtained image, a method of recognizing an object intruding into a certain set area in an obtained image, or the like. However, the image setting value and the image analysis method described above are examples, and the present disclosure is not limited thereto.

For example, a parking lot mode of the camera may include an image setting value including a high exposure sensitivity (ISO) and a high sharpness and an image analysis method for recognizing a license plate number in an obtained image.

Also, a person sensing mode may include an image setting value including a low exposure sensitivity and an image analysis method for recognizing a face in an obtained image.

However, these are only examples, and the present disclosure is not limited thereto.

The apparatus 100 for determining an operation mode of a camera according to an exemplary embodiment may determine one or more candidate operation modes with respect to each of the plurality of time periods, based on the installation environment information of the camera 200, which is obtained by the process described above (S220). Here, the apparatus 100 for determining an operation mode of a camera may determine the one or more candidate operation modes with respect to each of the plurality of time periods, by using various methods.

For example, the apparatus 100 for determining an operation mode of a camera may determine the one or more candidate operation modes based on the installation environment information obtained by the process described above and an operation mode determinant. Here, the operation mode determinant may be a pre-learned data set indicating a correlation between a plurality of pieces of installation environment information and a plurality of operation modes.

That is, the operation mode determinant may be information about the correlation between the plurality of pieces of installation environment information and the plurality of operation modes, that is, the mapping information thereof, which is generated via a machine learning method. For example, the operation mode determinant may be trained via a plurality of pieces of test data indicating an image and a desirable operation mode of the camera 200 in an environment corresponding to the image. Here, the image may be included in the installation environment information.

Meanwhile, when the installation environment information includes the information of the location in which the camera 200 is installed, the apparatus 100 for determining an operation mode of a camera may determine the one or more candidate operation modes based on an operation mode of another camera adjacent to the camera 200. In more detail, the apparatus 100 for determining an operation mode of a camera may identify operation modes of a certain number of adjacent cameras adjacent to the camera 200, based on the installation location information of the camera 200, the operation mode of which is to be determined (S221). Here, a criterion of being adjacent may vary. For example, the apparatus 100 for determining an operation mode of a camera may determine being adjacent means to be located in the same space (for example, the same room or the same floor). Also, when the installation location information includes the form of specific coordinates, the apparatus 100 for determining an operation mode of a camera may determine being adjacent means when a distance between two locations is equal to or less than a certain critical distance. However, these are only examples, and the present disclosure is not limited thereto.

The apparatus 100 for determining an operation mode of a camera may identify the operation modes of the adjacent cameras and may determine the operation mode of the most adjacent camera as the one or more candidate operation modes (S222). Also, the apparatus 100 for determining an operation mode of a camera may determine the operation mode, which is the most frequent from among the operation modes of the adjacent cameras, as the one or more candidate operation modes. However, the apparatus 100 for determining an operation mode of a camera may determine both of these two operation modes described above as the one or more candidate operation modes. However, these are only examples, and the present disclosure is not limited thereto.

As described above, the apparatus 100 for determining an operation mode of a camera according to an exemplary embodiment may determine the one or more candidate operation modes with respect to each of the plurality of time periods. In other words, the apparatus 100 for determining an operation mode of a camera may differently set the operation modes of the camera 200 with respect to the plurality of time periods.

According to the related art, even though a condition (for example, the amount of light, the volume of traffic, etc.) of a surrounding environment in which the camera 200 is installed changes according to time, the camera 200 is set in one operation mode, thereby not being able to obtain a proper image in a specific time period. This may raise a serious problem, such as an impossibility of reading an image, which may consequently cause the surveillance system to be useless.

According to the present disclosure, the operation mode of the camera 200 may be simply set with respect to each of the plurality of time periods, so that the camera 200 may obtain optimum images in all of the plurality of time periods.

In the present disclosure, the "time period" may denote a temporal section defined by a start point and an end point. The time period may be set to have a certain size (for example, ten minutes, one hour, etc.). In this case, the apparatus 100 for determining an operation mode of a camera may obtain the installation environment information of the camera 200 based on a certain time interval and may determine the candidate operation modes of the camera 200 based on the obtained installation environment information and the operation mode based on the candidate operation modes.

Also, the time period may be set as various sizes based on a change in the installation environment information. In this case, when the apparatus 100 for determining an operation mode of a camera determines that a change equal to or higher than a certain value occurs between installation environment information in a previous time period and the installation environment information, the apparatus 100 for determining an operation mode of a camera may start a new time period (that is, a temporal section), and may determine new candidate operation modes and a new operation mode with respect to the new time period. However, this is only an example, and the present disclosure is not limited thereto.

The apparatus 100 for determining an operation mode of a camera according to an embodiment may determine any one of the one or more candidate operation modes with respect to each of the plurality of time periods, as the operation mode of the camera 200 in each of the plurality of time periods (S230).

Here, the apparatus 100 for determining an operation mode of a camera may select any one of the one or more candidate operation modes as the operation mode based on a user input. In more detail, the apparatus 100 for determining an operation mode of a camera may provide, to a user, the one or more candidate operation modes with respect to a certain time period and an image obtained in the time period, via the display 140 (S231).

Here, the apparatus 100 for determining an operation mode of a camera may further provide preview images corresponding to the one or more candidate operation modes.

In more detail, the apparatus 100 for determining an operation mode of a camera may generate the preview images corresponding to the one or more candidate operation modes by correcting an image obtained in each of the plurality of time periods to correspond to the one or more candidate operation modes. In other words, the apparatus 100 for determining an operation mode of a camera may generate the preview images predicted when the one or more candidate operation modes are to be applied to the camera 200. Next, the apparatus 100 for determining an operation mode of a camera may provide, to the user, the preview images corresponding to the one or more candidate operation modes with respect to each of the plurality of time periods, together with the image obtained in each of the plurality of time periods.

For example, when there are three candidate operation modes, the apparatus 100 for determining an operation mode of a camera may generate three preview images predicted when the three candidate operation modes are applied to the camera 200, respectively, and display the three preview images on the display 140, in addition to the image obtained in the corresponding time period. Here, the apparatus 100 for determining an operation mode of a camera may determine the operation mode in the corresponding time period, based on a user input of selecting the one or more candidate operation modes (S232).

As described above, the operation of determining the operation mode in a corresponding time period based on the user input may be performed in the same way with respect to the plurality of time periods. For example, when there are three time periods, the user may select the operation mode with respect to each of the three time periods, thereby separately selecting the operation modes with respect to the three time periods.

Meanwhile, when the apparatus 100 for determining an operation mode of a camera provides the one or more candidate operation modes to the user, the controller 110 may provide the one or more candidate operation modes based on a priority order.

For example, when the apparatus 100 for determining an operation mode of a camera determines the one or more candidate operation modes based on the operation mode determinant, as described above, the apparatus 100 for determining an operation mode of a camera may display, at first, the candidate operation mode having the highest relevance.

Also, when the apparatus 100 for determining an operation mode of a camera determines the most frequent operation mode from among the operation modes of the adjacent cameras, as the one or more candidate operation modes, the apparatus 100 for determining an operation mode of a camera may display, at first, the top three frequent operation modes as the one or more candidate operation modes.

The apparatus 100 for determining an operation mode of a camera according to an exemplary embodiment may change the image setting value and the image analysis method of the camera 200 to correspond to the determined operation mode in each of the plurality of time periods (S240). As described above, the image setting value may include a resolution of an image, a frame rate of an image, an exposure sensitivity of an image, an aperture value, a white balance, or the like. Also, the image analysis method may include a method of recognizing and tracking a person in an obtained image, a method of recognizing a license plate number in an obtained image, a method of recognizing loitering of an object in an obtained image, a method of recognizing an object intruding into a certain set area in an obtained image, or the like.

However, the image setting value and the image analysis method described above are examples, and the present disclosure is not limited thereto.

FIG. 4 illustrates an example of a mode determination screen 400 displayed on the display 140.

As described above, the apparatus 100 for determining an operation mode of a camera may provide, to a user, one or more candidate operation modes with respect to a certain time period and an image obtained in the time period. In more detail, the apparatus 100 for determining an operation mode of a camera may generate a preview image corresponding to each of the one or more candidate operation modes, by correcting the image obtained in the time period to correspond to each of the one or more candidate operation modes. In other words, the apparatus 100 for determining an operation mode of a camera may generate the preview image predicted when each of the one or more candidate operation modes is applied to the camera 200. Next, the apparatus 100 for determining an operation mode of a camera may provide the preview image corresponding to each of the one or more candidate operation modes to the user together with the image obtained in the corresponding time period.

For example, with respect to a time period between 00:00 and 07:00, three preview images 412 through 414 predicted when the one or more candidate operation modes are applied to the camera 200, with respect to an image 411 obtained in this time period, may be provided, together with the image 411. Likewise, with respect to a time period between 07:00 and 20:00, three preview images 422 through 424 predicted when the one or more candidate operation modes are applied to the camera 200, with respect to an image 421 obtained in this time period, may be provided, together with the image 421.

As described above, according to the present disclosure, the preview images predicted when the candidate operation modes are applied to the camera 200 are provided together with the image in the corresponding time period, and thus, the user may intuitively select the operation mode with respect to each of the plurality of time periods and may reduce a time for setting the camera 200.

Figure 5A:
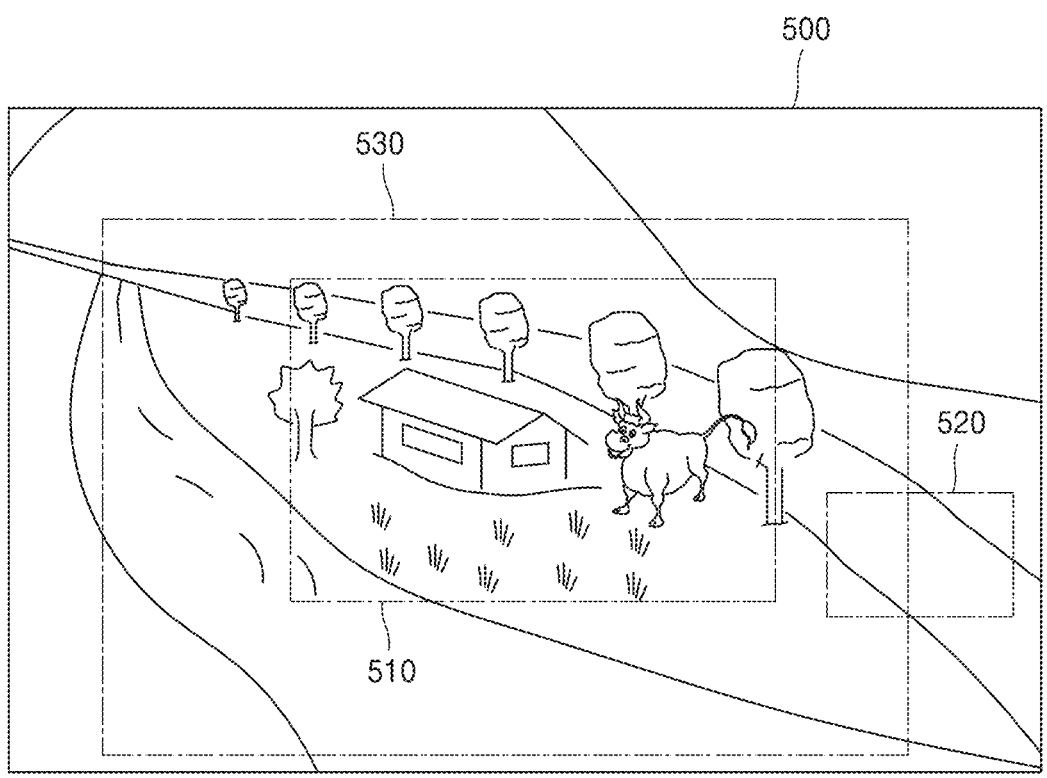
FIG. 5A is a view for describing a photographing viewing angle and/or a photographing scale of a camera in an environment in which the camera is installed, in the case of a pan tilt zoom (PTZ) camera, according to an exemplary embodiment.

FIG. 5A is a view for describing photographing viewing angles and/or photographing scales 510, 520, and 530 of the camera 200 in an environment 500 in which the camera 200 is installed, when the camera 200 is a PTZ camera, according to an exemplary embodiment. FIG. 5B illustrates an example of a mode determination screen 600 displayed on the display 140, when the camera 200 is a PTZ camera.

Meanwhile, as described above, the apparatus 100 for determining an operation mode of a camera may determine the one or more candidate operation modes such that the one or more candidate operation modes include at least one of a pan value, a tilt value, and a zoom value with respect to each of a plurality of time periods.

Accordingly, images 611 and 621 obtained in the plurality of time periods, preview images 612 through 614 and 622 through 624, and PTZ values with respect to the images 611 through 614 and 621 through 624 may be provided on the mode determination screen 600. For example, the PTZ value of the first preview image 622 in a time period between 06:00 and 12:00 may correspond to the second viewing angle and/or the second scale 520 of FIG. 5A. Similarly, the PTZ value of the second preview image 623 may correspond to the first viewing angle and/or the first scale 510 of FIG. 5A.

The images 611 and 621 obtained in the plurality of time periods and the preview images 612 through 614 and 622 through 624 are described with reference to FIG. 4, and thus, their detailed descriptions will be omitted.

As described above, according to the present disclosure, the preview images predicted when the candidate operation modes are applied to the camera 200, in particular, the preview images having different PTZ values, are provided together with the image in the corresponding time period, and thus, a user may intuitively select the operation mode with respect to each of the plurality of time periods and may reduce a time for setting the camera 200.

As described above, according to the one or more of the above embodiments, a method and an apparatus for determining an operation mode of a camera based on a time period may be realized.

Also, a method and an apparatus for conveniently setting an operation mode of a camera with respect to each of a plurality of time periods, so that the camera is capable of obtaining an optimum image in all of the time periods, may be realized.

Also, a method and an apparatus for setting an operation mode of a camera, whereby a preview image when a candidate operation mode is applied to the camera is provided together with an image in a corresponding time period, so that the operation mode is intuitively selected with respect to each of a plurality of time periods and a time for setting the camera is reduced, may be realized.

Also, a method and an apparatus for setting operation modes of cameras of various forms including a PTZ camera and a multi-sensor camera, with respect to each of a plurality of time periods, so that the cameras are capable of obtaining an optimum image, may be realized.

The network management method according to embodiments may be embodied as computer-readable code in a computer-readable recording medium. The computer-readable recording medium may be any recording apparatus capable of storing data that is read by a computer system. Examples of the computer-readable recording medium include read-only memories (ROMs), random-access memories (RAMs), CD-ROMs, magnetic tapes, floppy disks, and optical data storage devices. The computer readable recording medium may be distributed among computer systems that are interconnected through a network, and the present disclosure may be stored and implemented as computer readable code in the distributed system. Functional programs, code, and code segments for embodying the present disclosure may be easily derived by programmers in the technical field to which the present disclosure pertains.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A method of determining an operation mode of a camera with respect to each of a plurality of time periods, the method comprising:
   obtaining installation environment information of the camera, the installation environment information comprising images obtained by the camera in the plurality of time periods;
   determining at least two candidate operation modes with respect to each of the plurality of time periods, with reference to the installation environment information of the camera; and
   determining the operation mode of the camera with respect to each of the plurality of time periods, wherein the operation mode is selected from the determined at least two candidate operation modes with respect to the each of the plurality of time periods,
   wherein:
   the time periods are continuous and defined by dividing an entire day into predetermined time intervals;
   the determining of the at least two candidate operation modes comprises determining the at least two candidate operation modes based on the installation environment information and an operation mode determinant; and
   the operation mode determinant comprises a pre-learned data set indicating a correlation between a plurality of installation environment information and a plurality of operation modes, the pre-learned data set being generated by a machine learning method and comprising mapping information for the plurality of installation environment information and the plurality of operation modes.

2. The method of claim 1, wherein the installation environment information comprises installation location information of the camera, and
   the determining the at least two candidate operation modes comprises:
   identifying operation modes of a certain number of adjacent cameras adjacent to the camera, with reference to the installation location information; and
   determining the at least two candidate operation modes based on the operation modes of the certain number of adjacent cameras.

3. The method of claim 1, wherein the determining of the operation mode of the camera with respect to each of the plurality of time periods comprises:
   providing a user with at least two candidate operation modes with respect to a first time period and an image obtained in the first time period; and
   determining an operation mode of the first time period based on a user selection with respect to the at least two candidate operation modes with respect to the first time period.

4. The method of claim 3, wherein the providing the user with the at least two candidate operation modes with respect to the first time period and the image obtained in the first time period comprises:
   generating a preview image corresponding to each of the at least two candidate operation modes by correcting the image obtained in the first time period to correspond to each of the at least two candidate operation modes; and providing the user with the preview image corresponding to each of the at least two candidate operation modes, together with the image obtained in the first time period.

5. The method of claim 4, further comprising, after determining the operation mode of the camera with respect to each of the plurality of time periods, changing an image setting value and an image analysis method of the camera to correspond to the determined operation mode, with respect to each of the plurality of time periods.

6. The method of claim 4, wherein the at least two candidate operation modes with respect to each of the plurality of time periods comprise an image setting value of the camera for obtaining an image and an image analysis method with respect to the obtained image.

7. The method of claim 6, wherein the camera is a pan tilt zoom (PTZ) camera, and
the at least two candidate operation modes with respect to each of the plurality of time periods further comprise at least one of a pan value, a tilt value, and a zoom value, in addition to the image setting value and the image analysis method of the camera.

8. The method of claim 6, wherein the camera is a multi-sensor camera comprising two or more image sensors configured to obtain images, and
the at least two candidate operation modes with respect to the each of the plurality of time periods comprise an image setting value and an image analysis method of each of the two or more image sensors, with respect to each of the plurality of time periods.

9. A non-transitory computer-readable recording medium storing a computer program for determining an operation mode of a camera with respect to each of a plurality of time periods, wherein the computer program, when executed by a computer, performs the method comprising:
obtaining installation environment information of the camera, the installation environment information comprising images obtained by the camera in the plurality of time periods;
determining at least two candidate operation modes with respect to each of the plurality of time periods, with reference to the installation environment information of the camera; and
determining the operation mode of the camera with respect to each of the plurality of time periods, wherein the operation mode is selected from the determined at least two candidate operation modes with respect to the each of the plurality of time periods,
wherein:
the time periods are continuous and defined by dividing an entire day into predetermined time intervals;
the determining of the at least two candidate operation modes comprises determining the at least two candidate operation modes based on the installation environment information and an operation mode determinant; and
the operation mode determinant comprises a pre-learned data set indicating a correlation between a plurality of installation environment information and a plurality of operation modes, the pre-learned data set being generated by a machine learning method and comprising mapping information for the plurality of installation environment information and the plurality of operation modes.

10. An apparatus for determining an operation mode of a camera with respect to each of a plurality of time periods, the apparatus comprising a controller configured to:
obtain installation environment information of the camera, the installation environment information comprising images obtained by the camera in the plurality of time periods;
determine at least two candidate operation modes with respect to each of the plurality of time periods, with reference to the installation environment information of the camera; and
determine the operation mode of the camera with respect to each of the plurality of time periods, wherein the operation mode is selected from the determined at least two candidate operation modes with respect to the each of the plurality of time periods,
wherein:
the time periods are continuous and defined by dividing an entire day into predetermined time intervals;
the controller is further configured to determine the at least two candidate operation modes based on the installation environment information and an operation mode determinant; and
the operation mode determinant comprises a pre-learned data set indicating a correlation between a plurality of installation environment information and a plurality of operation modes, the pre-learned data set being generated by a machine learning method and comprising mapping information for the plurality of installation environment information and the plurality of operation modes.

11. The apparatus of claim 10, wherein the installation environment information comprises an installation location information of the camera, and
the controller is further configured to:
identify operation modes of a certain number of adjacent cameras adjacent to the camera, with reference to the installation location information; and
determine the at least two candidate operation modes based on the operation modes of the certain number of adjacent cameras.

12. The apparatus of claim 10, wherein the controller is further configured to:
provide a user with at least two candidate operation modes with respect to a first time period and an image obtained in the first time period; and
determine an operation mode of the first time period based on a user selection with respect to the at least two candidate operation modes with respect to the first time period.

13. The apparatus of claim 12, wherein the controller is further configured to:
generate a preview image corresponding to each of the at least two candidate operation modes by correcting the image obtained in the first time period to correspond to each of the at least two candidate operation modes; and
provide the user with the preview image corresponding to each of the at least two candidate operation modes, together with the image obtained in the first time period.

14. The apparatus of claim 10, wherein the controller is further configured to change an image setting value and an image analysis method of the camera to correspond to the determined operation mode, with respect to each of the plurality of time periods.

15. The apparatus of claim 10, wherein the at least two candidate operation modes with respect to each of the plurality of time periods comprise an image setting value of the camera for obtaining an image and an image analysis method with respect to the obtained image.

16. The apparatus of claim 15, wherein the camera is a pan tilt zoom (PTZ) camera, and
   the at least two candidate operation modes with respect to each of the plurality of time periods further comprise at least one of a pan value, a tilt value, and a zoom value, in addition to the image setting value and the image analysis method of the camera.

17. The apparatus of claim 15, wherein the camera is a multi-sensor camera comprising two or more image sensors configured to obtain images, and
   the at least two candidate operation modes with respect to the each of the plurality of time periods comprise an image setting value and an image analysis method of each of the two or more image sensors, with respect to each of the plurality of time periods.

\* \* \* \* \*